Figure 1:
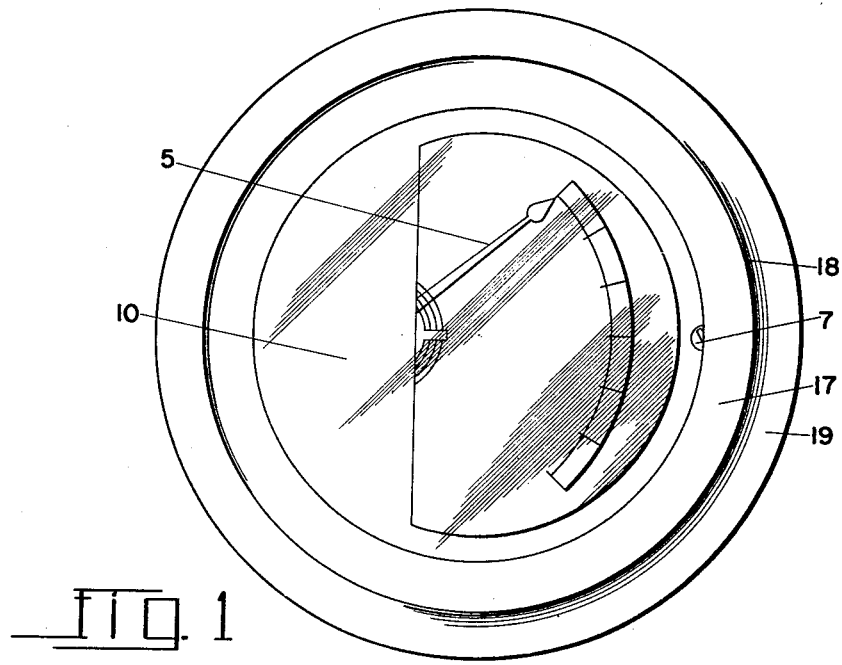

June 3, 1952     R. L. TRIPLETT     2,599,212

CASE FOR ELECTRICAL MEASURING INSTRUMENTS

Original Filed April 25, 1949

INVENTOR
RAY L. TRIPLETT
BY
Toulmin & Toulmin
ATTORNEYS

Patented June 3, 1952

2,599,212

UNITED STATES PATENT OFFICE 2,599,212

CASE FOR ELECTRICAL MEASURING INSTRUMENTS

Ray L. Triplett, Bluffton, Ohio, assignor to The Triplett Electrical Instrument Company, Bluffton, Ohio, a corporation of Ohio Original application April 25, 1949, Serial No. 89,466. Divided and this application February 23, 1950, Serial No. 145,711

4 Claims. (Cl. 220—82)

The present invention relates to electrical instruments and more particularly to devices for sealing the glass window with respect to the case of the instrument.

This application is a division of my prior application Serial No. 89,466, entitled "Cases for Electrical Measuring Instruments," filed April 25, 1949, and assigned to the same assignee as this application.

Instrument cases which are hermetically sealed against moisture entering the glass window usually have an inert gas or dehydrated atmosphere inside to prevent sweating when exposed to temperature changes. The seals must be made to hold against leaks when exposed to extreme changes in temperature—usually −55° to +85° C.—as well as to withstand severe vibration.

It has heretofore been the practice to seal the glass window by first coating the pre-tempered glass with silver which is fused at a temperature of about 1100° F. to the glass. The silver coating serves as a tinning base permitting the glass to be soldered direct to the metal case. However, due to the very thin coating and changes in the solder affected by temperature and vibration, pin holes often develop which allow moisture to enter the case. The glass and metal must have the same co-efficient of expansion to avoid breakage of the glass when temperature changes occur.

The present invention avoids the necessity for silver-tinning the glass and therefore eliminates the possibility of pin holes developing, with the additional advantage of obviating the necessity of having to use glass and metal with the same coefficient of expansion.

The main object of the invention is to provide an improved seal for electrical instruments that will remain hermetically tight and moistureproof under extreme changes of temperature and humidity.

Another object is to provide an improved combined seal and support for a glass window in an instrument case which can be easily applied without strain on the glass.

Still another object is to provide an improved seal between a glass window and the instrument case which will prevent cold flow of the insulating material and thereby remain hermetically tight under all practical conditions of operation.

A further object is to provide an improved seal between the glass window and an instrument case, which will withstand any practical degree of vibration that might be applied to the case and still retain its sealing qualities.

Another object is to provide an improved hermetic seal between the glass window and the case of an instrument which can be applied to the glass window without introducing stress or strain and thereby provide protection from breakage.

The final object is to provide an improved seal and support between the glass window and an instrument case as can be applied or spread in a cold state and become flexible when heated to a hardening temperature.

The above objects are carried out in brief by providing flexible gaskets on both sides of the window of the instrument.

Figure 2:
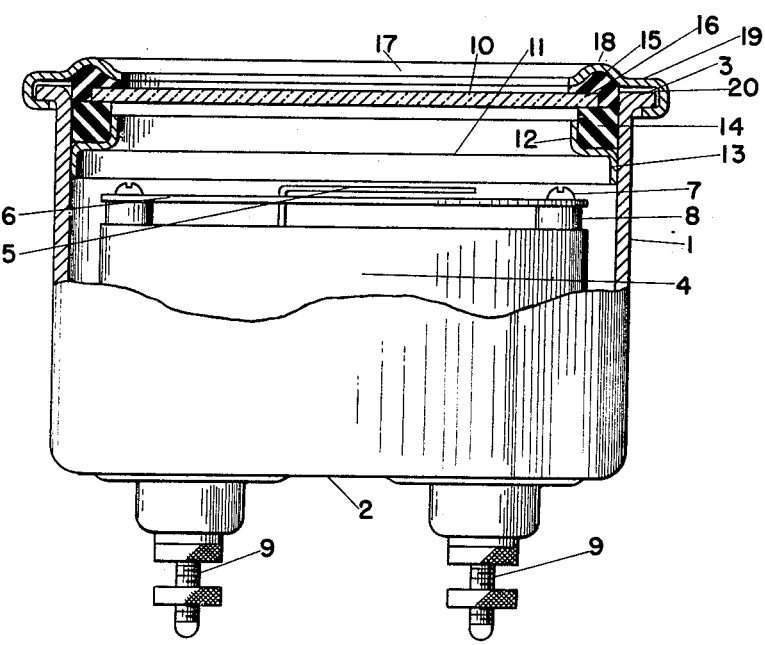

Other objects and features will be apparent as the following specification is perused in connection with the accompanying drawings in which:

Figure 1 is a plan view of the instrument case provided with a glass window supported in the improved manner within the case; and Figure 2 represents an elevational view of the improved case and window support, a portion of the case being broken away and sectioned to show the interior parts.

Referring to Figure 1, reference character 1 designates a cylindrical member made of any suitable metal such as steel or aluminum, having a base 2 at one end and terminating at the other end in an outwardly extending flange 3. Within this cylindrical case there is an instrument movement 4 which may include a typical type of magnet, and a rotor which carries a pointer 5. This pointer is adapted to swing over a brass dial 6 of any suitable and well known type, the dial being secured to the magnet member of the movement 4 by means of screws 7 and spacers 8. The movement 4 is suitably mounted by rods (not shown) above a support plate (not shown) contained in the bottom of the case. The rotor may be of the wound type and connections are taken from the winding through torsional springs to a pair of terminals (not shown) in the bottom support plate where connection is made to terminal posts 9 which are taken through the bottom member 2 of the casing. Suitable types of terminals for taking these wires through the casing in an insulating and in a hermetically tight manner are shown in application Serial No. 89,466 referred to hereinbefore.

Instruments of the character described are very delicate in nature and their ultra-sensitivity can easily be impaired by rough handling, and particularly by the action of moisture entering around the glass window when the case is subjected to vibration. Minute leaks are apt to form where the glass window is supported with respect to the case.

In accordance with my invention, the glass window 10 is resiliently mounted in such a way as to be completely hermetically sealed and immune to moisture and leakage even when subjected to severe shocks and vibration. A support ring or bracket 11 of steel is provided, this bracket having an inwardly flared or shouldered portion 12 to leave an annular space between that portion and the interior surface of the case 1. The outermost portion of the ring indicated at 13 has an external diameter such as snugly to fit within the case to which it can be welded or otherwise secured prior to mounting the terminal post 9 in place. A gasket 14 of "Silicone" or "Silastic" or other suitable rubbery compounds, preformed and packed or cured to a ring shape, may be inserted in the annular space provided by the cylindrical bracket. These organic Silicon compounds are characterized by a high degree of adherence to metal surfaces and extreme resilience when packed, similar to rubber. Moreover, the compounds are strictly impermeable to air, water or electricity.

The gasket should fit fairly snugly within this space and also should have a height somewhat greater than the depth of the shoulder 12 so as to permit the plate glass window 10 to rest thereon. The window is made of smaller diameter than the case and is held in proper diametral position by means of a ring 15 of the same material as the element 14, or any other suitable flexible rubbery material. This ring is formed with a recessed surface 16, which when pressed against the gasket 14, completely fills the space between the edge of the window and the interior surface of the case.

The pressure on the gasket 15 is applied conveniently by means of a bezel 17 made of steel or other suitable material, the bezel being formed with a curvilinear hump indicated at 18 to fit over the gasket 15. The bezel is also provided with a flat surface 19 where it extends over the flange 3 and is of sufficient diametral size as to be bent around the flange and eventually crimped or otherwise secured to the under-surface of the flange.

It will be noted that the upper flat portion 19 of the bezel is spaced a trifle from the flange 3, this spacing being indicated at 20, to assure a clamping effect to be exercised on the gasket when the lower surface of the bezel is crimped around the flange. Moreover, the outermost diameter of the bezel 17 is such as to leave a slight space about the outer diameter of the flange 3 in order that there will be no undue friction between the bezel and the flange when the bezel is being secured to the under-side surface of the flange. The bezel therefore has a free movement downward during the crimping operation and pressure can be resiliently exercised against the gasket 15 by the curved portion 18 of the bezel. The joint between the gaskets 14, 15 and the interposed window 10 is hermetically tight and also strictly moisture-proof. It is apparent that the window is supported entirely within a rubber matrix about its outer edge and on both sides thereof and therefore can withstand vibration or mechanical shock.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A window mount for an instrument case, said mount comprising a ring of flexible material fitted to the interior surface of the case and held in position by a cylindrical bracket, the bracket extending short of the bearing surface of the ring so that the window can rest exclusively on the ring, a ring of flexible material on the opposite side of the window and projecting into the space between the edge of the window and the interior of the instrument case, a flange provided on the case substantially adjacent to said rings, an annular plate bearing directly against the upper ring and secured to said flange whereby the rings are clamped together to said case.

2. A window mount for an instrument case, said mount comprising a ring of flexible material fitted to the interior surface of the case and held in position by a cylindrical bracket, the bracket extending short of the bearing surface of the ring so that the window can rest exclusively on the ring, a ring of flexible material on the opposite side of the window and projecting into the space between the edge of the window and the interior of the instrument case, means secured to the instrument case for clamping the two rings together in order flexibly to mount the window with respect to the case, said rings being formed of an organic compound which when heated is converted to a rubbery flexible mass, said means including a flange provided on the case substantially adjacent to said rings, an annular plate bearing directly against the upper ring and secured to said flange whereby the rings are clamped together to said case.

3. A window mount for an instrument case, said mount comprising a window having its outer edge portion and peripheral surface embedded in a matrix of flexible material, a bracket member extending around the interior surface of the case and attached thereto, said matrix being supported by said bracket, a metal ring bearing directly against the upper surface of the matrix, a flange formed on the exterior surface of the casing, said ring being secured to said flange and adapted to compress said matrix against the bracket member, whereby the edge of the window is yieldably supported within the casing, the upper portion of said matrix being provided with an upstanding hump intermediate the edges thereof, and said metal ring being provided with a corresponding recess to receive said hump in order to exert greater compression on the matrix when the ring is secured to said flange.

4. A window mount for an instrument case, said mount comprising a window having its outer edge portion and peripheral surface embedded in a matrix of flexible material, a bracket member extending around the interior surface of the case and attached thereto, said matrix being supported by said bracket, a metal ring separate from the casing and adapted to be secured thereto, said ring bearing directly against the upper surface of said matrix to compress the latter and flexibly support the edge of the window on said bracket, the upper portion of said matrix being provided with an upstanding hump intermediate the edges thereof, and said metal ring being provided with a corresponding recess to receive said hump in order to exert greater compression on the matrix when the ring is secured to the casing, an outwardly extending flange at the window end of the casing, said metal ring being provided with a peripheral lip at its peripheral edge which extends inwardly to embrace the lower surface of said flange in order securely to attach the ring to said casing.

RAY L. TRIPLETT.

REFERENCES CITED

The following references are of record in the file of this patent:

UNITED STATES PATENTS

| Number | Name | Date |
|---|---|---|
| 116,272 | Collins et al. | June 27, 1871 |
| 1,466,790 | Crocker | Sept. 4, 1923 |
| 1,664,985 | Mauser | Apr. 3, 1928 |
| 1,699,804 | Mylius | Jan. 22, 1929 |
| 1,909,404 | Horn | May 16, 1933 |
| 2,215,537 | Bjong | Sept. 24, 1940 |
| 2,317,213 | Oliver | Apr. 20, 1943 |
| 2,346,495 | Lingel | Apr. 11, 1944 |
| 2,367,449 | Triplett | Jan. 16, 1945 |